United States Patent [19]
Fry

[11] Patent Number: 5,456,743
[45] Date of Patent: Oct. 10, 1995

[54] WATER SOLUBLE PRINTING SHEET

[75] Inventor: Arthur L. Fry, Maplewood, Minn.

[73] Assignee: Binney & Smith Inc., Easton, Pa.

[21] Appl. No.: 196,579

[22] Filed: Feb. 14, 1994

[51] Int. Cl.⁶ ................................................. C09D 11/02
[52] U.S. Cl. ........................................ 106/27 R; 106/20 R
[58] Field of Search .............................. 106/20 R, 27 R; 428/195, 207

[56] References Cited

U.S. PATENT DOCUMENTS

| | | | |
|---|---|---|---|
| 404,778 | 6/1889 | Davis . | |
| 414,378 | 11/1889 | Davis . | |
| 523,737 | 7/1894 | Deckert . | |
| 729,045 | 5/1903 | Dick . | |
| 826,733 | 7/1906 | Moore . | |
| 1,951,947 | 3/1934 | Pistocco | 101/129 |
| 2,031,763 | 2/1936 | Eaton | 101/297 |
| 2,581,153 | 1/1952 | Wallich | 101/128.4 |
| 2,651,255 | 9/1953 | Wallich | 101/125 |
| 2,927,531 | 3/1960 | Hirsch et al. | 101/134.5 |
| 3,263,605 | 8/1966 | Fry | 101/170 |
| 3,993,492 | 11/1976 | Woolly | 106/31 R |
| 4,145,244 | 3/1979 | Covey | 156/541 |
| 4,212,676 | 7/1980 | Ueda | 106/19 B |
| 4,550,660 | 11/1985 | Sato | 101/129 |
| 4,708,817 | 11/1987 | Dudnick | 252/301.16 |
| 4,852,483 | 8/1989 | Bussard | 101/128 |
| 4,978,390 | 12/1990 | Snedeker | 106/19 B |
| 5,055,498 | 10/1991 | Brachman | 523/164 |
| 5,176,076 | 1/1993 | Azuma | 101/123 |
| 5,276,075 | 1/1994 | Santini | 524/40 |

OTHER PUBLICATIONS

Brochure for "Wacky·Tac" Children's Art Kit by Letraset® no date available.
Brochure for "Colorwand™" by Letraset® no date available.

*Primary Examiner*—Helene Klemanski
*Attorney, Agent, or Firm*—Leydig, Voit & Mayer, Ltd.

[57] ABSTRACT

An ink composition for use in printing sheets including a binder, a wet print bleed control additive and a colorant. The composition may also contain a surfactant, an opacifier as well as a preservative. The ink composition may be used as a film or applied to a printing sheet backing to provide a printing sheet for making prints. Also, printing plates, having pieces of varying colored printing sheets are disclosed for creating multi-colored prints. Also disclosed is a process for making such printing sheets and a process for making a print with such printing sheets. These compositions are non-toxic and multi-colored prints can be easily made by a child using the disclosed printing sheets and plates.

12 Claims, 1 Drawing Sheet

WATER SOLUBLE PRINTING SHEET

TECHNICAL FIELD OF THE INVENTION

The present invention is directed to a water soluble inks, ink films, ink in sheets, and to methods of manufacturing such inks and ink sheets. More particularly, the invention is directed to ink and printing sheets for use by children in producing multiple prints of a child's art work.

BACKGROUND OF THE INVENTION

There are disclosed in the prior art a number of inks. These compositions are generally used in printing press operations and writing instruments such as pens and markers. These compositions are often termed either permanent or non-permanent. Generally, permanent inks comprise, in part, organic solvent soluble materials while typical non-permanent inks are water soluble. A resistance to light and air is also a factor for permanent inks. An ink that is not water soluble, but fades quickly in light is not permanent. However, some water based binders combined with earth or charcoal pigments used for cave paintings have withstood the test of ages.

Inks generally are mixtures of a coloring matter dispersed or dissolved in a carrier fluid. The coloring matter, if readily dissolved in the carrier fluid is termed a dye. An insoluble coloring material is termed a pigment. Pigments generally are finely ground solid materials. The nature and amount of pigment or dye contained in an ink composition determines its color.

In the past, inks have been used to make prints of an original composition by use of stencil printing, block printing (relief printing), screen printing, lithographic printing or intaglio printing. Screen printing requires a great deal of equipment, such as screen frames, squeegees, and resist materials. Relief printing requires gouges and cutting tools, wood, linoleum, or vinyl plates, inking rolls (brayers), printing inks, and often printing presses.

Intaglio printing of an ink composition from the recessed surfaces of metal or plastic printing plates (etchings and engravings) require such skills and equipment that it is rarely used even in high school level art classes.

In addition to the obvious difficulties of children making use of these types of printing processes such as the high degree of skill and dexterity needed, children also would find it difficult to produce prints having multiple colors. Obviously, the play value children gain from being able to use various colors, such as those available from crayons and markers used by children, is highly desirable and a printing system for children should be capable of yielding multi-color prints or reproductions.

The difficulties presented by these various reproduction methods may be overcome by the use of sheets of material such as paper or plastic which are coated with an ink which may be transferred to a second medium such as paper.

Printing sheets which may be adhered to a support and are used in relief or intaglio printing are described in U.S. Pat. No. 3,263,605 which is assigned to Minnesota Mining and Manufacturing Company. These sheets were like a thick rubber block in composition.

For a period of time, Minnesota Mining and Manufacturing sold water soluble printing sheets which were of high solubility and which were coated from solution rather than a hot melt. However, these sheets were ultimately unsuccessful because the inks used were highly water soluble and individual sheets coated with the ink would stick together at high humidities without a suitable separator sheet. In addition, these sheets were very difficult to use when printing onto wet and highly absorbent paper sheets since much of the ink would dissolve and a sheet coated with the ink could yield very few prints as a result of the ink going into solution. Further, as a result of the ink going into solution, smeared prints were often produced and clearly defined images were difficult, if not impossible, to produce. Also, greater pressure than can be produced by the hand of a child was required to make a print with these sheets.

Also, the Minnesota Mining and Manufacturing sheets required a wet coating and drying process for manufacture; an expensive process which requires expensive base papers for the printing sheets because they must withstand large lateral forces while being pulled wet through long drying ovens.

It is, therefore, an object of the present invention to provide an ink composition which may be used to produce multiple prints or copies, It is also an object of the present invention to produce a printing sheet for easy use by children requiring minimal, commonly available, and safe tools.

A further object of the invention is to provide ink for use on a printing sheet which are washable and non-toxic.

A further object of the invention is to provide ink compositions which are water soluble, while still having a low tack or adhesion level to wet paper, and which do not block or stick to each other at 100% Relative Humidity.

It is also an object of the invention to simplify printmaking such that it can be performed in the home or classroom in an economical manner, especially by children.

It is also an object of the present invention to produce a printing sheet onto which has been coated an ink composition of the invention.

A still further object of the invention is to provide printing sheets capable of releasing controlled amounts of an ink composition, even onto very wet and absorbent papers, without smearing or bleeding.

Another object of the present invention is to provide ink films with sufficient flexibility and adhesion to a printing sheet backing to resist flaking, cracking and falling off when the films are flexed, handled and incised.

An additional object of the present invention is to provide ink films which are inherently economical and stimulate creativity because the cut pieces may assembled into finished prints and scrap pieces may generally be used resulting in a printing plate much larger than the original piece as opposed to wood or linoleum block printing plates or silk screen stencils where the artist removes part of the printing medium which cannot be further used.

A further object of the present invention is to provide ink films which can be given additional detailing by incising or engraving away the ink composition with a pencil or other suitable sharp object, or by covering the ink composition with a water insoluble resist, such as a common wax crayon, grease pencil, liquid wax or a candle.

Another object of the present invention is to provide a printing sheet having a layout drawn with pencil or pen on the paper side of the ink sheets, thereby reducing the mess of working directly on the surface having the ink composition and the ink composition pieces are right-reading, not the mirror images required when working from the ink composition side of the sheets.

It is also an object of the present invention to provide various printing sheets respectively coated with various colors of the ink composition of the invention which may have various figures or shapes cut from each of the sheets which can then be combined on a master plate to enable the printing of a multi-colored print.

Finally, an object of the present invention is to permit intaglio type printing to be easily performed by covering the ink film with crayon and scratching through the crayon to the ink composition with a pencil, and printing by hand pressure or with a soft rubber roller.

SUMMARY OF THE INVENTION

The present invention provides an ink composition containing from about 18% to about 50% by weight of a water soluble or semi-soluble thermoplastic binder, from about 10% to about 70% by weight of a wet print bleed control additive and from about 3% to about 50% by weight of a colorant. Preferably, the ink composition also contains from about 0% to about 8%, preferably from about 1% to about 8%, by weight of a surfactant. More preferably, in addition to the surfactant, the ink composition also contains from about 0% to about 70%, preferably from about 1% to about 70%, by weight of an opacifier. The ink composition in its solid state may be used as a film for making prints. More desirably, the ink composition is melted and coated on a printing sheet backing forming a printing sheet with which prints may be made. The printing sheets may be cut or otherwise designed and adhered to a master sheet with an adhesive to create a master printing plate capable of printing a variety of colors in a single print as well as producing multiple copies of the same multi-colored print.

The present invention also provides a process for producing a printing sheet comprising melting an ink composition of the present invention and coating the composition on a printing sheet backing.

Further, the present invention provides a process for making a printing sheet which comprises making the ink composition by mixing and melting a binder, a surfactant, a wet print bleed control additive and a pigment, coating the composition on a printing sheet, wetting a material on which the print is to be made and pressing the material to the surface of the printing plate.

DETAILED DESCRIPTION OF THE INVENTION

Figure 1:
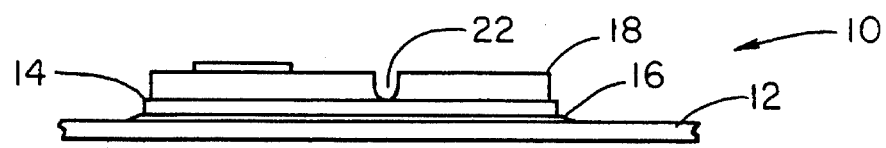
FIG. 1 represents a side view of a master printing plate.

The ink composition, ink film and printing sheet using the ink composition of the present invention result in a great improvement over previously available compositions and printing sheets. It has been discovered that by using thermoplastic binders that melt and flow freely at temperatures above 190° F. in preparing the ink composition to be used as a film or on the printing sheet, manufacturing of the film and printing sheet is greatly simplified and the manufacturing and raw material costs of the finished films and printing sheets are markedly decreased. Prints made using the printing sheet of the present invention result in sharper printed images and little or no smearing. In addition, the printing sheets of the present invention yield more prints per printing sheet than those previously available.

An ink film is simply the ink composition in solid, unsupported form. The ink composition has two physical states. The ink composition is a solid below 100° F. and a liquid paste above 200° F. The ink film is easily made by melting the composition and spreading it on a surface from which it may be easily removed. After the ink composition has returned to a more solid state, it may be popped off the surface to which it was applied leaving an ink film. The surface material to which the ink composition is applied is a release material to which the ink composition does not stick and is easily removed. The release material is preferably a metal, such as aluminum foil. Another suitable release material is silicone coated release papers.

The printing sheet manufacturing process of the present invention is also a simple melting and mixing process. First, the ink composition is prepared. In the present use, once the ink composition is prepared, the "ink" is in a solid state. To prepare a printing sheet of the present invention, the ink composition is melted and the melted ink composition is spread on a printing sheet backing, for instance, paper, by bar, knife, roller, die, rotogravure, or screen coating techniques. This coating process is rapid and water-free and the ink composition has little tack once it is printed onto the printing sheet backing. Also, because the coating of the printing sheet backing is not a wet process requiring drying, simple, inexpensive papers may be used as printing sheet backings. This simplification eliminates the expense of high strength papers required in previous wet processes to withstand the rigors of drying.

The problems of printing multiple colors in a registry are eliminated as the present invention permits multiple colors to be printed simultaneously. This can be done simply be creating a master printing plate which contains pieces from printing sheets of a variety of colors attached by an adhesive or glue.

Inks that get sticky or adhesive or tacky when wet with water delaminate the wet papers both of the ink printing sheet or master plate and the printed sheets. Thus, the most commonly available papers can be used for the master plate or the printed sheets of the present invention.

The ink composition of the present invention comprises from about 18% to about 50% by weight of one or more binders, from about 10% to about 70% by weight of a wet print bleed control additive, and from about 3% to about 50% by weight of one or more colorants. Preferably, the ink compositions also contain from about 0% to about 8%, preferably from about 1% to about 8%, by weight of a surfactant, and more preferably the ink compositions also contain from about 0% to about 70%, preferably from about 1% to about 70%, by weight of one or more opacifiers.

A binder is a material which, in its dry form, acts as an adhesive to hold the powdery components to each other, any printing sheet backing, such as paper, when the ink composition is coated onto the backing, and to the printed articles.

The binders used in the ink composition of the present invention are waxy, film-forming, water soluble materials. Such binders are often used as surfactants and base materials for cosmetics. For example, one suitable binder is polyethylene glycol 6000 distearate, an ester of stearic acid and polyethylene glycol. Stearates are derived from animal fats and laureates are derived from coconuts. Stearates, oleates and laureates are basic materials often used in soaps and emulsifying agents. The number in the polyethylene glycols and their esters, such as the 6000 in PEG 6000 distearate, represents the average molecular weight of the ethylene oxide units in the binder. The greater the number, the more ethylene oxide units in the chain.

The binder of the present invention is preferably a thermoplastic binder which melts and flows freely at temperatures above 190° F. The use of such binder simplifies the manufacturing process and reduces the manufacturing and raw material cost of the ink composition of the present invention as well as printing sheets made using that ink composition. Any suitable water soluble or semi-water soluble thermoplastic binder or combination of binders may be used. Examples include polyethylene glycols and polyethylene glycol esters, fatty acid esters and fatty acid salts having average molecular weights from about 500 to 20,000, including Carbowax™ PEG 1000 (manufactured by Union Carbide), Carbowax™ PEG 20 M (a trifunctional polyethylene glycol 20,000 manufactured by Union Carbide), Pluracol E 4500™ PEG 4500 (manufactured by BASF), Pluracol E 1450™ PEG 1450 (manufactured by BASF Wyandotte Corporation), KESSCO™ PEG 600 monostearate (manufactured by Stepan Chemical), KESSCO™ PEG 1000 monostearate (manufactured by Stepan Chemical), KESSCO™ PEG 600 dilaurate (manufactured by Stepan Chemical), KESSCO™ PEG 600 monolaurate (manufactured by Stepan Chemical), KESSCO™ PEG 6000 monostearate (manufactured by Stepan Chemical), TA-1618™ stearyl alcohol (manufactured by Proctor & Gamble), sugars and glues.

Preferably, binders PEG 6000 distearate (manufactured by Stepan Chemical) and stearyl alcohol (manufactured by Proctor & Gamble) are used in combination. Although PEG 6000 distearate may be used alone as a binder, PEG 6000 distearate used in combination with stearyl alcohol is preferred as a binder. Stearyl alcohol is nearly water insoluble, is lower in cost, and has a lower melt viscosity than PEG 6000 distearate. Therefore, stearyl alcohol contributes to a melted form ink composition that flows and coats more easily than an ink composition containing PEG 6000 distearate alone. However, if stearyl alcohol is used alone, the resulting prints will be very light because very little ink composition is dispensed with each printing. PEG 6000 distearate is water soluble and allows a small amount of ink composition to be dissolved at each printing, resulting in bright prints. Therefore, the combination of stearyl alcohol and PEG 6000 distearate is desirable to control the water solubility of the ink composition which ultimately controls the amount of ink composition transferred during the printing process.

Also of note is that stearyl alcohol tends to bleed out of the ink composition into the paper printing sheet backing when the melted ink composition is coated onto the backing for use as a printing sheet. The PEG 6000 distearate retards this bleeding effect. A minimal amount of bleeding may be desirable for binding of the ink composition to the printing sheet backing and also for binding the paper fibers together giving them additional wet strength. Again, a combination of the two binders is more desirable. The PEG 6000 distearate is preferably present in an amount of 100% to 30% by weight of the total binder, while stearyl alcohol is preferably present in an amount of from 0% to 80% by weight of the total binder. A 50:50 ratio is most preferred because it provides a good balance of cost, ease of formulating, resultant film flexibility, humidity resistance and ease of coating.

Ink compositions produced using binders with lower water solubility, such as a combination of stearyl alcohol and PEG 6000 distearate, are especially useful for producing printing sheets of the present invention. Preferably, any binder used has a limited water solubility, such as PEG 6000 distearate, or even sodium stearate bar soaps.

Ink compositions containing binders having lower water solubility tend to produce more prints and are more tolerant of varying degrees of paper wetness than ink compositions having more soluble binder materials such as PEG 1000. Further, higher colorant ratios must be used in ink compositions using less soluble binders to obtain an equal print hue to ink formed using more soluble binders.

The binder of the present invention is present in amounts of from about 18% to about 50% by weight, preferably from about 20% to 30% by weight of the total ink composition. These ranges are desirable because the binder, along with a surfactant, provides fluidity to the melted form of the ink composition. If too little binder is present, the melt viscosity of the ink composition is equal to that of a heavy paste and it becomes more difficult to coat with the normal coating techniques described herein. Also, too little binder results in the powdery components not being held together, resulting in the cracking or flaking of the ink composition of the present invention when they are bent or cut. If binder content is too high, the wet print bleed control additive is not as effective in controlling the bleed of the ink composition on wet papers when the ink composition is used to produce prints.

Wet print bleed control additives are useful in the ink composition of the present invention to provide resistance to flow of the ink composition. Controlling flow of the ink composition is especially useful when the ink composition is used on printing sheets since prints made from those printing sheets do not bleed on wet papers and sharper images are produced on such prints. The wet print bleed control additive functions by absorbing the binder and colorant by capillary action or by holding the binder and colorant in a viscous medium that prevents their migration on wet paper. Any suitable wet print bleed control additive may be used in the present ink compositions, including any compatible additive that imparts thixotropic control. Suitable additives include insoluble powders such as kaolin clay marketed under the name Kaolex D-6™ and manufactured by Wilkinson Kaolin Associates Ltd., talc marketed under the name Nytal 400™ and manufactured by R. T. Vanderbilt Co., sodium bentonite, magnesium carbonate, silicas, attapulgite clays, agents which supply thixotropic flow control to paints, and organic materials such as corn starch, wheat flour or dispersion grade vinyl chloride resins. Calcium carbonate marketed under the name Veroc #1™ and manufactured by White Pigment Corporation is preferable because it provides a more abrasive tooth to the surface resulting in better acceptance of crayon marks. Kaolin clay, on the other hand, provides a smoother coating that does not accept crayon markings as well over the ink in the masking process because they slide over it.

Kaolin clay may also be used when mixing pigments together to make such mixing easier.

The wet print bleed control additive is present in ink compositions of the present invention in amounts of from about 10% to about 70% by weight, preferably about 10% to about 65% by weight. Where less than 10% wet print bleed control additive is used, the colorants and water soluble binders of the ink composition will bleed on wet surfaces. Where greater than about 70% wet print bleed control additive is used, the ink films crack and flake. Melt viscosity also increases at high levels of wet print bleed control additive which complicates coating. Opacities can also increase making the ink too pastel or requiring more colorant to correct the colors.

The weight percentages can vary with different bleed control additives. For example, additives such as sodium bentonite or silicas which have large surface to weight ratios or low density materials like starches are effective at lower weight ratios than coarser and denser materials such as calcium carbonate and barium sulphate.

The ink compositions of the present invention also contains one or more colorants to achieve any desired color, including, but not limited to, blue, green, yellow, red, orange, violet, brown and black. Any suitable dye may be used, including oil, alcohol and water soluble dyes. However, the use of pigment is preferable. Any suitable pigments may also be used, including burnt umber, red oxide, acid yellow 17, acid blue 9, acid red 18, hansa yellow pigment, dianisidine orange, acid orange 8, lithol red, acid red 52, acid red 18, ultramarine blue, lithol rubine, iron blue, acid blue 204, acid blue 9, phthalo green, and phthalo blue green.

Colorants may be present in an amount of from about 3% to about 50% by weight, preferably 3% to 11% by weight. The colorant level is optimized by reducing the amount of the ink composition that is dissolved per printing impression. Consequently, delivery of the same colorant level to a print with two ink compositions of varying water solubility will require different levels of colorant. The composition with lower solubility will have higher colorant loadings than the composition with higher water solubility. Therefore, if colorant levels are on the low side, the print the ink compositions deliver is light. If the colorant level is on the high side, cost and optimum print brightness without affecting ink film flexibility and melt flow characteristics should be balanced. The colorant amount is also affected by use of dyes versus pigments, and the particle size and melt flow characteristics of different colorants.

If more than one colorant is used, particularly if more than one is a pigment, kaolin clay may optionally be used to make the mixing of the pigments possible without the use of expensive equipment.

Optionally, the ink compositions of the present invention may contain a surfactant to limit graininess and/or enhance the melt flow characteristics of the ink composition. Generally speaking, surfactants wet dissimilar materials, thereby helping to bond the individual components of the ink composition to themselves and each other. Also, when the ink composition is used to form printing sheets of the present invention, the surfactant assists in bonding the ink composition to the printing sheet backing and the finished print. Surfactants may also act as plasticizers for the finished ink composition making films of the ink composition resistant to cracking when flexed. Surfactants also reduce melt viscosity and function as defoamers to release the air trapped by the powdery components of the ink composition. Frothy compositions will have increased surface areas and may dissolve at non-uniform rates.

Any suitable surfactant may be used in the ink compositions of the present invention, including but not limited to polyethylene glycols and polyethylene glycol esters, fatty acid esters and fatty acid salts having an average molecular weight less than 1000, such as KESSCO™ PEG 600 dilaurate manufactured by Stepan Chemical and KESSCO™ PEG 600 monolaurate manufactured Stepan Chemical, polyoxyethylene-propylene glycol marketed under the name Pluronic L61™ and manufactured by BASF Corporation, polyoxypropylene-polyoxyethylene block copolymer marketed under the name Pluronic L101™ and manufactured by BASF Corporation and an oleyl alcohol marketed under the name Adol 85™ by Sherex Chemical Co. The preferred surfactant is marketed under the name Foamkill 614™ and manufactured by Crucible Chemical Company. It is stated to be a pale yellow opaque petroleum hydrocarbon liquid having a boiling point greater than 400° F., a specific gravity of 0.905, a flash point of 300° F. The specific chemical identity of Foamkill 614 is withheld as a trade secret. Depending upon the selected binder, colorant and wet print bleed control additive, a surfactant may not be required. Therefore, the surfactant may be present in an amount of from about 0% to about 8% by weight. However, the ink compositions of the present invention preferably contain a surfactant in an amount from about 1% to about by weight, and more preferably from about 3% to about by weight. This is because in some circumstances, less than 1% of a surfactant results in an ink composition which may yield films which are brittle and crack during flexure. Further, the melt viscosity of the ink composition may be excessive making coating difficult. Surfactant concentration greater than about 8% results in the ink compositions which yield films which are too soft.

The ink compositions of the present invention can also contain one or more opacifiers. Any suitable opacifier may be used, such as barium sulphate sold under the name Blanc Fixe™ and manufactured by Enco Chemical Corporation, kaolin clay sold under the name Kaolin D-6™ and manufactured by Wilkinson Kaolin Associates Ltd., attapulgite clays, titanium dioxide sold under the name RCL 3™ and manufactured by Glidden, talc sold under the name Nytal 400™ and manufactured by R. T. Vanderbilt Co., and calcium carbonate sold under the name Veroc #1™ and manufactured by White Pigment Corporation.

Preferred opacifiers are titanium dioxide such as that manufactured by Glidden Corporation and marketed under the trade name Rutile, RCL 3™ and calcium carbonate sold by White Pigment Corporation and marketed under the trade name Veroc #1™. Opacifiers are present in an amount of from about 0% to about 70% by weight, preferably from about 1% to about 70% by weight, and more preferably about 2% to about 65% by weight.

Opacifiers are whiteners that function by having a different refractive index than the rest of the composition, which reflects the light around in the composition and then back out to the viewer. The greater the difference in refractive index, the greater the opacifying effect. Thus, titanium dioxide is a more efficient opacifier than calcium carbonate. However, it is often desirable to use calcium carbonate in addition to titanium dioxide because it aids the opacifying efficiency of the titanium dioxide by acting as a spacer between titanium dioxide particles, which in turn increases light scattering. Calcium carbonate also is less expensive, acts as a wet print bleed control additive and has more abrasiveness than titanium dioxide to produce better crayon marking.

The use of opaque inks are a matter of choice and transparent ink compositions may be made. In this way, the overlapping of one transparent color over another would produce a third color. Opaque inks are preferable because color overlapping is not common in the use of this printing method, transparent pigments look very dark and different on the ink film than on the printed image, unless opacifiers are added, and transparent ink compositions on colored papers could lose the visual image that the artist has chosen, i.e., a transparent yellow ink composition printed on red paper would appear orange.

Some pigments are already opaque and the addition of an opacifier is not required. In fact, addition of an opacifier to such colors often makes them appear pastel or gray. For example, black and brown would not require a whitener such as titanium dioxide unless a pastel or gray color is desired. Further, in other ink compositions, high levels of titanium dioxide results in colors which are too pastel leading to higher levels of colorant, thereby increasing melt viscosities and composition costs.

Under certain circumstances, such as when a white composition is desired, the opacifier may also act as a colorant. Use of titanium dioxide without other colorants will provide a white ink composition and the opacifier, therefore, also acts as the colorant.

To maintain the shelf life of the present ink composition, a preservative may be added. The benchmark for measuring an effective amount of a preservative is the otherwise identical composition lacking the preservative. The relevant comparison is whether the preservative retards or delays the onset of decay and/or microbiological growth in either composition. The preservative preferably serves as both a bactericide and a fungicide, and is added in any effective amount, though a typical concentration range is from about 0.1% up to about 5.0% by weight. The use of preservatives in levels greater than about 5% by weight may cause the ink composition to become toxic or unstable and may, in any event, be unnecessary.

Any conventional preservative may be utilized in the invention as long as there is compatibility with the remaining ink composition components and they do not flash off due to high temperatures during the heating process. For example, preservatives methyl paraben marketed under the name Methyl Parasept® by Kalama Chemical Inc., propyl paraben marketed under the name Propyl Parasept ® by Kalama Chemical Inc., and diazolidinyl urea manufactured by Sutton Laboratories and sold under the trade name Germall II may be suitable in the composition of the invention.

The ink composition of the present invention may be produced by the following process. Initially, the binder or binders, preferably PEG 6000 distearate and stearyl alcohol, are melted, usually at a temperature of between 150° F. and 300° F. A temperature of about 200° F. is preferable. The surfactant, preferably Foamkill 614, is added to the melt and blended. Subsequently, the wet print bleed control additive, preferably calcium carbonate, opacifiers, preferably titanium dioxide, and colorant are mixed in. The calcium carbonate acts as both a wet print bleed control additive and a opacifier under preferable conditions. The ink composition may then be stored at the melt temperature or allowed to cool. Where the ink composition is to be used to produce a printing sheet or a ink film, it is preferred to maintain the ink composition in its melt state and to use the ink composition to produce the desired films or printing sheets as soon as possible to conserve costs associated with maintaining such an elevated temperature.

The ink compositions of the present invention are washable and non-toxic. Therefore, they may be safely used by children.

The following are formulated as examples of the ink composition of the present invention but, of course, should not be construed as in any way limiting its scope.

EXAMPLE 1

| Brown Ink Composition | |
|---|---|
| Component | Weight % |
| PEG Distearate 6000 | 12.35 |
| Stearyl Alcohol | 12.35 |
| Foamkill 614 | 3.70 |
| $CaCO_3$ | 61.73 |
| $TiO_2$ | 0 |
| Pigment | |
| Burnt Umber | 3.67 |
| Red Oxide | 1.22 |
| Acid Yellow 17 | 2.22 |
| Acid Blue 9 | 0.27 |
| Acid Red 18 | 2.49 |

EXAMPLE 2

| Yellow Ink Composition | |
|---|---|
| Component | Weight % |
| PEG Distearate 6000 | 12.05 |
| Stearyl Alcohol | 12.05 |
| Foamkill 614 | 3.61 |
| $CaCO_3$ | 60.24 |
| $TiO_2$ | 2.41 |
| Pigment | |
| Hansa Yellow Pigment | 2.27 |
| Acid Yellow 10 | 7.37 |

EXAMPLE 3

| Orange Ink Composition | |
|---|---|
| Component | Weight % |
| PEG Distearate 6000 | 12.05 |
| Stearyl Alcohol | 12.05 |
| Foamkill 614 | 3.61 |
| $CaCO_3$ | 60.24 |
| $TiO_2$ | 2.41 |
| Kaolin clay | 4.40 |
| Pigment | |
| Dianisidine Orange | 1.09 |
| Acid Orange 8 | 4.15 |

EXAMPLE 4

| Red Ink Composition | |
|---|---|
| Component | Weight % |
| PEG Distearate 6000 | 14.08 |
| Stearyl Alcohol | 14.08 |
| Foamkill 614 | 4.23 |
| $CaCO_3$ | 56.34 |
| $TiO_2$ | 2.82 |
| Kaolin clay | 1.20 |

-continued

Red Ink Composition

| Component | Weight % |
|---|---|
| Pigment | |
| Hansa Yellow Pigment | 0.95 |
| Lithol Red | 0.90 |
| Dianisidine Orange | 0.30 |
| Acid Red 52 | 0.60 |
| Acid Red 18 | 4.44 |

EXAMPLE 5

Violet Ink Composition

| Component | Weight % |
|---|---|
| PEG Distearate 6000 | 12.05 |
| Stearyl Alcohol | 12.05 |
| Foamkill 614 | 3.61 |
| $CaCO_3$ | 60.24 |
| $TiO_2$ | 2.41 |
| Kaolin Clay | 1.14 |
| Pigment | |
| Ultramarine Blue | 1.01 |
| Lithol Rubine | 0.15 |
| Iron Blue | 0.12 |
| Acid Red 52 | 3.61 |
| Acid Blue 204 | 3.61 |

EXAMPLE 6

Blue Ink Composition

| Component | Weight % |
|---|---|
| PEG Distearate 6000 | 12.05 |
| Stearyl Alcohol | 12.05 |
| Foamkill 614 | 3.61 |
| $CaCO_3$ | 60.24 |
| $TiO_2$ | 2.41 |
| Kaolin Clay | 0.15 |
| Pigment | |
| Ultramarine Blue | 1.49 |
| Ultramarine Blue | 5.75 |
| Iron Blue | 0.29 |
| Acid Blue 9 | 1.96 |

EXAMPLE 7

Green Ink Composition

| Component | Weight % |
|---|---|
| PEG Distearate 6000 | 12.05 |
| Stearyl Alcohol | 12.05 |
| Foamkill 614 | 3.61 |
| $CaCO_3$ | 60.24 |
| $TiO_2$ | 2.41 |
| Talc | 0.53 |
| Kaolin Clay | 0.53 |
| Pigment | |
| Phthalo Green | 0.22 |

-continued

Green Ink Composition

| Component | Weight % |
|---|---|
| Phthalo Blue Green | 0.15 |
| Acid Yellow 17 | 7.23 |
| Acid Blue 9 | 0.98 |

EXAMPLE 8

Black Ink Composition

| Component | Weight % |
|---|---|
| PEG Distearate 6000 | 12.35 |
| Stearyl Alcohol | 12.35 |
| Foamkill 614 | 3.70 |
| $CaCO_3$ | 61.72 |
| $TiO_2$ | 0 |
| Black pigment | 9.88 |

Titanium dioxide was left out of the brown ink composition of Example 1 because it made the color more pastel than desired. Titanium dioxide may also be eliminated from the orange composition of Example 3, the violet composition of Example 5 and the black composition of Example 8 to provide a less pastel hue.

In its most simple form, the ink composition of the present invention may be in film form. A printing sheet backing is not required. Films may be made quite simply by coating the melted ink composition on a surface from which the ink composition may be removed. Such surface may be a release material, preferably a metal. Examples of such release materials include aluminum foil and silicon coated release papers. The ink composition may then be removed from such release material leaving only an ink composition film. The films of the present invention are not as desirable because there is no manner in which to pick up or use the ink composition without getting it on other surfaces or body parts.

The preferred use of the ink composition of the present invention is in the creation and use of printing sheets which allow a user to produce multiple copies of an original work. In its most preferable form, a printing sheet backing is coated with the heat melted ink composition of the invention. The combination of printing sheet backing and ink composition produces a printing sheet. Since the ink composition is somewhat water soluble, the printing sheet can be used to transfer or dispense multiple copies of a design onto wet surfaces such as wet paper without bleeding or smearing.

Printing sheets of the present invention are produced by preparing the ink composition by mixing one or more binders, a wet print bleed control additive, colorant, optionally containing kaolin clay if needed, and optionally a surfactant and/or one or more opacifiers, at a temperature greater than about 150° F., preferably greater than about 200° F. The hot ink composition of the present invention is then coated onto a printing sheet backing. The printing sheet backing may be any suitable material, preferably paper or bonded, nonwoven fabrics and films. Examples include alkaline paper, sulphite paper, plastic films, and ground woodpaper, but 20 lb. bond paper is preferable. The ink composition may be spread on the printing sheet backing using any suitable coating equipment, such as a knife, bar, roller, rotogravure, die or screen coating equipment. Wet bleeding of the liquid components of the ink composition may be controlled by quick chilling the ink composition to a solid form.

The final ink film coating on the printing sheet backing should have a thickness of from about 0.001" (1 mil) to about 0.006" (6 mils). Preferably, a film coating of about 0.003" (3 mils) thick to about 0.004" (4 mils) thick ink composition is achieved. A 3–4 mil film thickness of ink composition on the printing sheet backing produces a printing sheet which can provide roughly 10–30 prints. If the thickness of the ink composition is too low, it may be difficult to get multiple prints. However, if the thickness is too great, the printing sheet may be difficult to handle and the ink composition may be inflexible or crack and flake. Also, use of thicker films will result in greater expense.

Where a less soluble ink composition, produced by using a less soluble binder, is used, the printing sheet will yield approximately 30 prints. Where an ink composition is used which has a higher solubility, produced by using a more soluble binder, the printing sheet will generally yield 10–20 prints.

The ink compositions of the present invention, particularly those identified in Examples 1–8, are capable of being engraved, as well as accepting crayon resist markings. However, at 100% Relative Humidity, the characteristics of the ink compositions and printing sheets may vary. For example, the ink compositions of Example 6 were placed on printing sheet backings in the described manner and placed in a chamber at 100% Relative Humidity at 70° F. After 24 hours, the printing sheets and ink compositions on the sheets were flexible and soft and the ink composition was easily engraved. However, the ink compositions were too soft to accept crayon resist markings. After three weeks, the printing sheets did not block or stick to each other.

As previously mentioned, the ink compositions of the present invention can be made in many colors. Therefore, the printing sheets of the present invention may also be produced in a variety of colors. By combining pieces of printing sheets of various colors on a master sheet, a user, such as a child, can easily build a collage picture. The resulting collage picture may then be used as a master printing plate that can simultaneously print multiple colored copies of the original master printing plate.

To build such a master printing plate, individual design pieces are commonly cut from the printing sheets with scissors or by tearing off pieces. Pieces of the various color printing sheets can also be cut with a stencil knife. The individual pieces can be attached to a master sheet with adhesives, such as glues or tapes, forming a master printing plate.

FIG. 1 shows just such a master printing plate 10. The master printing plate 10 has a master sheet 12 onto which pieces of one or more printing sheets 14 are attached by use of an adhesive layer 16 or other attaching mechanism, such as double sided tape. The master sheet 12 may be any suitable material including 20 lb. bond paper, alkaline paper, sulphite paper, plastic films, ground-wood paper, chip board and card stock. The pieces of printing sheet 14 are attached to the master sheet 12 such that the ink composition coating 18, which in combination with the printing sheet backing 19 forms the printing sheet 14, is on the side of the printing sheet 14 away from the master sheet 12.

Regions on the printing sheets 14 may also be prevented from transferring color during the printing operation by deactivating the ink composition 18 either by covering the ink composition with a water insoluble resist 20 such as a crayon mark, or by removing the ink composition from the printing sheet by simple engraving techniques 22, such as scratching the ink composition off with a pencil point or other sufficiently hard instrument. Such procedures are useful for adding detail to a print.

Figure 2:
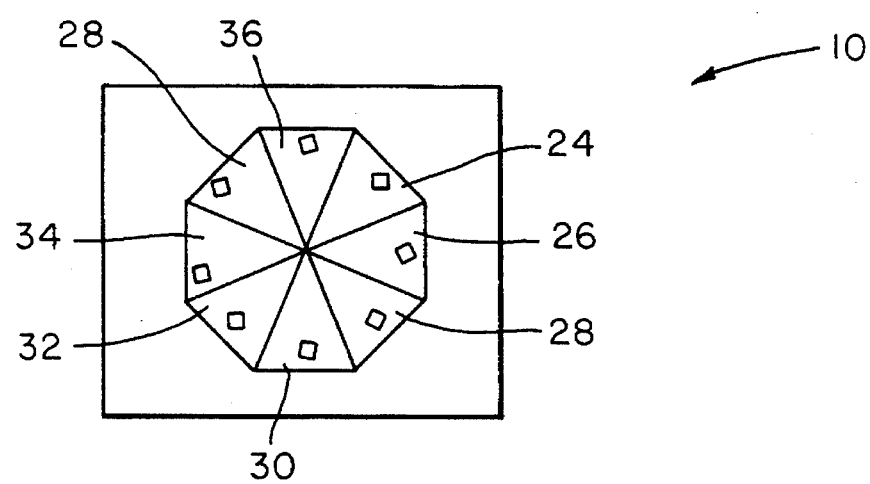
FIG. 2 represents a top view of a master printing plate.
Figure 3:
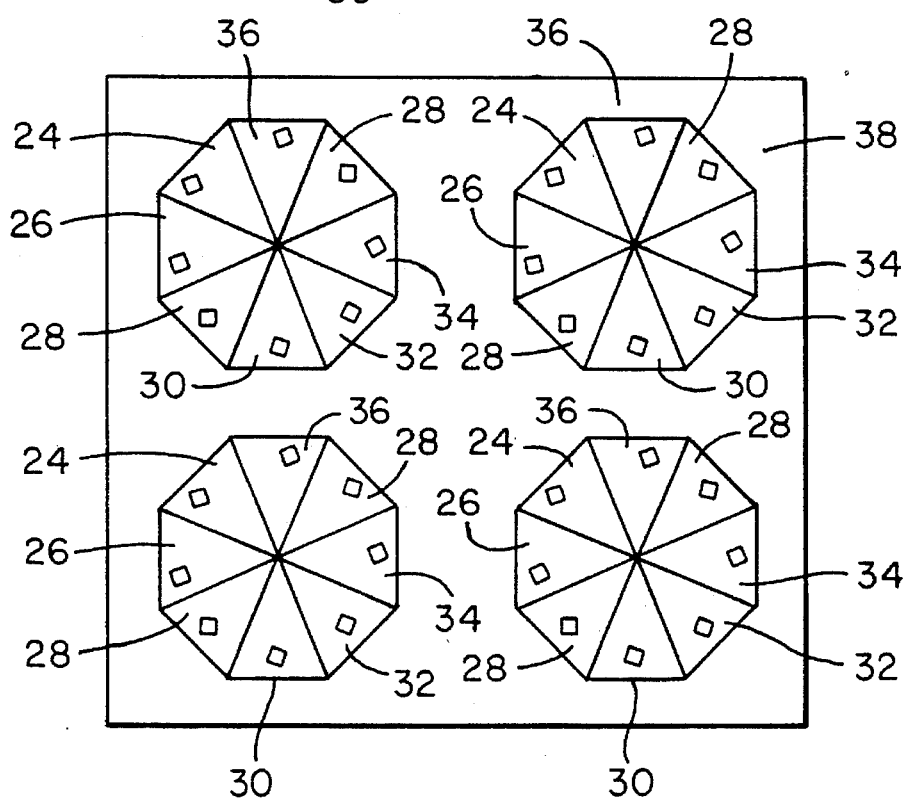
FIG. 3 represents multiple prints on a printing sheet backing made by a master plate.

FIG. 2 represents a top view of a master printing plate 10 and is an example of how a single master printing plate 10 can have a collage of colors. As shown in the Figure, printing sheets 14 having ink compositions of colors blue 24, green 26, orange 28, violet 30, brown 32, yellow 34 and red 36 are all included on the master printing plate 10. The master printing plate 10 may then be used to make multiple prints 38 of the master printing plate 10, each of the prints having each of these colors in a single application as shown in FIG. 3. No complicated registry techniques are required, as compared with other forms of multi-color printing.

Another aspect of the present invention is that on the side of the printing sheet 14 not having the ink composition coating 18, a layout may be made in pencil or pen, thereby reducing the mess of working directly on the ink composition surface. Also, a child may take a drawn figure, such as a cat, cut it out, and attach it to a master sheet. A further advantage is that the layout on the printing sheet is right-reading, rather than the mirror image, which is required if working with the ink composition side of the printing sheet backing 14.

Prints are made from the printing sheets or the master printing plate 10 simply by wetting the surface of a piece of paper or other suitable material onto which the user desires to produce a print. The wetted surface and the printing sheet or master printing plate 10 are then pressed with the light pressure of a soft roller or the pressure of your fingers, hands or feet. If the printed paper buckles and cockles after it has dried, it can be ironed flat with an iron on either side of the printed paper.

From the foregoing description and examples, it is apparent that the objects of the present invention have been achieved. The ink composition is non-toxic and washable and releases a controlled amount of ink on wet sheets without bleeding or smearing.

All of the references cited herein are hereby incorporated by reference in their entireties.

While this invention has been described with an emphasis upon preferred embodiments, it will be obvious to those of ordinary skill in the art that variations in the preferred ink compositions, printing sheet and method of manufacture may be used and that it is intended that the invention may be practiced otherwise than as specifically described herein. Accordingly, this invention includes all modifications encompassed within the spirit and scope of the invention as defined by the following claims.

What is claimed:

1. An ink composition comprising:
   (a) from about 18% to about 50% by weight of a thermoplastic binder said binder comprising from about 50% to about 80% by weight of the total binder a first binder of stearyl alcohol and from about 20% to about 50% by weight of a second binder selected from the group consisting of a fatty acid ester or a fatty acid salt, having an average molecular weight between 500 and 20,000, a polyethylene glycol or a polyethylene glycol mono- or di-ester, having an average molecular weight in the range of 1,000–7,000, sugars and glues, or combinations thereof;

(b) from about 0% to about 8% by weight of a surfactant having a molecular weight of less than 1,000;

(c) from about 10% to about 70% by weight of a wet print bleed control additive; and (d) from about 3% to about 50% by weight of a colorant.

2. The composition according to claim 1, wherein said surfactant is present in an amount of from about 3% to about 5% by weight.

3. The composition according to claim 1 wherein said wet print bleed control additive is selected from the group consisting of calcium carbonate, kaolin clay, talc, magnesium carbonate, sodium bentonite, silicas, attapulgite clays, corn starch, wheat flour, and vinyl chloride resins, and combinations thereof, and is present in an amount of from about 10% to about 65% by weight of said composition.

4. The composition according to claim 1, wherein said colorant is present in an amount of from about 3% to about 11% by weight.

5. The composition according to claim 1, wherein said thermoplastic binder is water soluble or semi-water soluble.

6. The composition according to claim 1, wherein said thermoplastic binder comprises from about 20% to about 50% by weight of total binder PEG 6000 distearate and from about 50% to about 80% stearyl alcohol by weight of total binder.

7. The composition according to claim 1, wherein said surfactant is selected from the group consisting of polyethylene glycols, polyethylene glycol esters, fatty acid esters, and fatty acid salts, having an average molecular weight less than 1000, Foamkill 614, and oleyl alcohol.

8. The composition according to claim 3, wherein said wet print bleed control additive comprises a combination of calcium carbonate, and kaolin clay.

9. The composition according to claim 8, wherein said composition comprises calcium carbonate in an amount of about 50% to about 65% by weight, titanium dioxide in an amount of from about 0% to about 4% by weight and kaolin clay in an amount of from about 0% to about 5% by weight of the total composition.

10. The composition according to claim 1, further comprising a preservative.

11. The composition according to claim 1, wherein said surfactant is present in an amount from about 1% to about 8% by weight.

12. The composition according to claim 1, wherein said colorant is selected from the group consisting of Burnt Umber, Red Oxide, Acid Yellow 17, Acid Blue 9, Acid Blue 204, Ultramarine Blue, Iron Blue, Acid Red 18, Acid Red 52, Hansa Yellow Pigment, Acid Yellow 10, Acid Yellow 17, Dianisidine Orange, Acid Orange 8, Lithol Red, Lithol Rubine, Phthalo Green, Phthalo Blue Green, and Black Pigment.

* * * * *

UNITED STATES PATENT AND TRADEMARK OFFICE
CERTIFICATE OF CORRECTION

PATENT NO. : 5,456,743
DATED : October 10, 1995
INVENTOR(S) : Arthur L. Fry

It is certified that error appears in the above-indentified patent and that said Letters Patent is hereby corrected as shown below:

Col. 8, line 13, after "1% to about" insert --8%--

Col. 8, line 14, after "3% to about" insert --5%--

Signed and Sealed this

Eighteenth Day of June, 1996

Attest:

BRUCE LEHMAN

*Attesting Officer*          *Commissioner of Patents and Trademarks*